(12) United States Patent
Qu et al.

(10) Patent No.: US 12,368,288 B2
(45) Date of Patent: Jul. 22, 2025

(54) GIS MECHANICAL FAULT DIAGNOSIS METHOD AND DEVICE

(71) Applicants: Electric Power Science & Research Institute of State Grid Tianjin Electric Power Company, Tianjin (CN); State Grid Tianjin Electric Power Company, Tianjin (CN); State Grid Corporation of China, Beijing (CN)

(72) Inventors: Bin Qu, Tianjin (CN); Li Zhang, Tianjin (CN); Rong Chen, Tianjin (CN); Liansheng Zhou, Tianjin (CN); Zhiyong Gan, Tianjin (CN); Chi Zhang, Tianjin (CN); Guohao Li, Tianjin (CN); Jin He, Tianjin (CN); Kun Wang, Tianjin (CN); Ziyue Wang, Tianjin (CN); Jian Wang, Tianjin (CN); Wei Fan, Tianjin (CN)

(73) Assignees: Electric Power Science & Research Institute of State Grid Tianjin Electric Power Company, Tianjin (CN); State Grid Tianjin Electric Power Company, Tianjin (CN); State Grid Corporation of China, Beijing (CN)

( * ) Notice: Subject to any disclaimer, the term of this patent is extended or adjusted under 35 U.S.C. 154(b) by 1260 days.

(21) Appl. No.: 17/117,106

(22) Filed: Dec. 9, 2020

(65) Prior Publication Data
US 2021/0167584 A1 Jun. 3, 2021

Related U.S. Application Data

(63) Continuation-in-part of application No. PCT/CN2020/096669, filed on Jun. 17, 2020.

(30) Foreign Application Priority Data

Nov. 29, 2019 (CN) .......................... 201911205810.X

(51) Int. Cl.
*H02B 13/065* (2006.01)
*G06N 3/048* (2023.01)
(Continued)

(52) U.S. Cl.
CPC ........... *H02B 13/065* (2013.01); *G06N 3/048* (2023.01); *G06N 3/063* (2013.01); *G06N 3/08* (2013.01);
(Continued)

(58) Field of Classification Search
CPC ...... H02B 13/065; G06N 3/048; G06N 3/063; G06N 3/08; G06N 3/084; G06F 2218/06;
(Continued)

(56) References Cited

U.S. PATENT DOCUMENTS 5,251,151 A * 10/1993 Demjanenko ............ G01H 1/00
702/56
5,305,235 A * 4/1994 Izui .......................... H02H 7/22
706/912
(Continued)

FOREIGN PATENT DOCUMENTS

| CN | 105973621 A | * | 5/2016 |
| CN | 108709723 A | | 10/2018 |

OTHER PUBLICATIONS

Xing et al. Fault Diagnosis Method of HV Circuit Breaker Based on Wavelet Packet Time—frequency Entropy and BP Neural Network, 2017, 6 pages (Year: 2017).*
(Continued)

*Primary Examiner* — Omar F Fernandez Rivas
*Assistant Examiner* — Tri T Nguyen

(57) ABSTRACT

A GIS mechanical fault diagnosis method and the device are disclosed. The method includes: collecting vibration signals
(Continued)

to be measured of various excitation sources of GIS in mechanical operation; performing wavelet packet-feature entropy vector extraction on the vibration signals to be measured, when it is determined that the vibration signals to be measured are abnormal according to standard vibration signals in the normal state; inputting the extracted wavelet packet-feature entropy vectors into the pre-trained BP neural network for GIS mechanical fault identification, and outputting the corresponding fault. The disclosure integrates the vibration signals under the action of various excitation sources, extracts the feature entropy vectors according to the entropy theory, and constructs and trains a BP neural network that can classify and recognize various GIS mechanical faults, so as to perform comprehensive and effective GIS mechanical faults diagnose.

6 Claims, 4 Drawing Sheets

(51) Int. Cl.
   *G06N 3/063* (2023.01)
   *G06N 3/08* (2023.01)
(52) U.S. Cl.
   CPC ...... *G06F 2218/06* (2023.01); *G06F 2218/12* (2023.01)
(58) Field of Classification Search
   CPC ............... G06F 2218/12; G06F 18/214; G06F 18/24133
   See application file for complete search history.

(56) References Cited

U.S. PATENT DOCUMENTS

| | | | | |
|---|---|---|---|---|
| 5,419,197 | A | * | 5/1995 | Ogi ..................... G05B 23/0281 73/659 |
| 2017/0234758 | A1 | * | 8/2017 | Wang ..................... G01M 3/24 73/24.01 |
| 2021/0140431 | A1 | * | 5/2021 | Zhang ................... F04B 53/144 |

OTHER PUBLICATIONS

Jin et al. Fault diagnosis of high-voltage circuit breakers using wavelet packet technique and support vector machine, 2017, 5 pages (Year: 2017).*
Gao et al. Mechanical Faults Diagnosis of High-Voltage Circuit Breaker via Hybrid Features and Integrated Extreme Learning Machine, May 7, 2019, 13 pages (Year: 2019).*
Sun et al. A New Method to Fault Diagnosis for Circuit Breakers Based on Characteristic Entropy of Wavelet Packet, 2011, 5 pages (Year: 2011).*
Mingliang et al. A New Fault Diagnosis Method for High Voltage Circuit Breakers Based on Wavelet Packet and Radical Basis Function Neural Network, 2014, 8 pages (Year: 2014).*
Lai-Jun Sun et al., Fault Diagnosis for High Voltage Circuit Breakers With Improved Characteristic Entropy of Wavelet Packet, Proceedings of the CSEE, Apr. 30, 2007, ISSN:0258-8013, pp. 104-107, vol. 27, No. 12.
Laijun Sun et al., Fault Diagnosis for HV Circuit Breakers with Characteristic Entropy of Wavelet Packet, Automation of Electric Power Systems, Jul. 25, 2006, ISSN:1000-1026, pp. 62-65, vol. 30, No. 14.

* cited by examiner

GIS MECHANICAL FAULT DIAGNOSIS METHOD AND DEVICE

CROSS REFERENCE TO RELATED APPLICATIONS

The present application is a Continuation-In-Part application of PCT Application No. PCT/CN2020/096669 filed on Jun. 17, 2020, which claims the benefit of Chinese Patent Application No. 201911205810.X filed on Nov. 29, 2019. All the above are hereby incorporated by reference in their entirety.

TECHNICAL FIELD

The disclosure relates to the technical field of power equipment monitoring, in particular to a GIS mechanical fault diagnosis method and device.

BACKGROUND TECHNOLOGY

As the voltage level of the power grid continues to rise, Gas Insulated Switchgear (GIS), also known as gas insulated fully enclosed combined electrical appliance, is used more and more widely in the power grid filed. However, when the GIS mechanically fails due to some internal defects in the mechanical movement, the GIS equipment will be damage huge losses may be caused to the power grid. Therefore, it is very necessary to study GIS mechanical fault detection in depth.

In the existing technology, detection of various latent mechanical faults of GIS in mechanical operation is usually the detection of partial discharges by such as ultra-high frequency, ultrasonic, coupling capacitance method, optical method and infrared temperature measurement technology and the like. Namely, the mechanical state signals under the operating state of the GIS equipment are detected, and the fault is directly diagnosed based on the simple difference of the mechanical state signal before and after the fault. Although this method is vivid and fast, it cannot effectively detect low-frequency mechanical signals and cannot accurately detect faults of the operating mechanism. According to the inventor's research and practice, it is found that the traditional mechanical fault diagnosis method fails to integrate efficient mathematical tools and data learning analysis, and the collection of mechanical state signals (vibration signals) related data is not comprehensive, resulting in that the effectiveness and reliability of GIS mechanical fault diagnosis is not high.

SUMMARY OF THE DISCLOSURE

The present disclosure aims to provide a GIS mechanical fault diagnosis method and device, which can diagnose the GIS mechanical fault comprehensively and effectively.

An embodiment of the present disclosure provides a GIS mechanical fault diagnosis method, including:
  collecting vibration signals to be measured of various excitation sources of GIS in mechanical operation;
  performing wavelet packet-feature entropy vector extraction on the vibration signals to be measured, when it is determined that the vibration signals to be measured are abnormal according to standard vibration signals in the normal state; and
  inputting the extracted wavelet packet-feature entropy vectors into the pre-trained BP neural network for GIS mechanical fault identification, and outputting the corresponding fault.

The vibration signals to be measured include vibration signal excited by an operating mechanism and vibration signal excited by electromagnetic force, and the operating mechanism includes a circuit breaker, an isolating switch, and a grounding switch.

Determining that the vibration signals to be measured are abnormal according to the standard vibration signals in the normal state includes:
  extracting the envelope of the vibration signal excited by the operating mechanism to obtain the envelope area by using Hilbert method; at the same time, extracting the vibration energy of the vibration signal excited by the electromagnetic force at the set frequency by using the FFT method;
  determining that the vibration signals to be measured are abnormal when the envelope area corresponding to the vibration signal excited by at least one operating mechanism satisfies the set first formula, and/or the vibration energy satisfies the set second formula; in which,
  the first formula is:

$$|E_S - E_{S0}|/E_{S0} \geq 5\%;$$

$E_S$ is the envelope area corresponding to the vibration signal excited by a certain operating mechanism, and $E_{S0}$ is the envelope area corresponding to the standard vibration signal excited by the operating mechanism;
  the second formula is:

$$|E_Q - E_{Q0}|/E_{Q0} \geq 5\%;$$

$E_Q$ is the vibration energy of the vibration signal excited by electromagnetic force at the set frequency, and $E_{Q0}$ is the vibration energy of the standard vibration signal excited by electromagnetic force at the set frequency.

The set frequency is 100 Hz; the collection time of the vibration signal excited by the electromagnetic force is 2 seconds, and the sampling frequency is 20 KHz; the collection period of the vibration signal excited by the operating mechanism is from the start time to the end time of the operation of the operating mechanism and 0.5 second extended.

Preferably, determining that the vibration signals to be measured are abnormal when the envelope area corresponding to the vibration signal excited by at least one operating mechanism satisfies the set first formula, and/or the vibration energy satisfies the set second formula includes:
  determining that the vibration signals to be measured are abnormal when the envelope areas corresponding to the vibration signals excited by at least two operating mechanisms satisfy the set first formula, and the vibration energy satisfies the set second formula.

Preferably, after collecting the vibration signals to be measured from various excitation sources of GIS in mechanical operation, the method further includes:
  performing wavelet soft threshold denoising processing on the vibration signals to be measured; and
  for the vibration signals to be measured after denoising processing, performing wavelet packet decomposition by using db10 of Daubechies wavelet series as wavelet base function.

Preferably, performing wavelet packet-feature entropy vector extraction on the vibration signals to be measured includes:
  performing k-layer wavelet packet decomposition on the vibration signals to be measured, and reconstructing the vibration signals at the $2^k$-th node of the k-th layer; and extracting the envelope of each reconstructed vibration signal, and dividing each envelope into N segments according to the principle of equal integral energy; and extracting the wavelet packet-feature entropy by the normalized value process, thereby obtaining the wavelet packet-feature entropy vectors.

The wavelet soft threshold is 2.1, and k=3; N=15.

Preferably, the training method of the BP neural network includes:

setting 8 neurons in the input layer and 3 neurons in the output layer, with the transfer functions all being tan-sigmoid, the training function being traingd, and the expected error being 0.01;

using the standard vibration signals in the normal state and the wavelet packet-feature entropy vectors of the vibration signal corresponding to various GIS mechanical faults as input to perform the training of the BP neural network; and determining that the number of hidden layer neurons is 10 and the step size is 0.31 according to the training results.

Another embodiment of the present disclosure also provides a GIS mechanical fault diagnosis device, including:

a signal collection module, configured to collect the vibration signals to be measured from various excitation sources of GIS in mechanical operation;

a feature entropy vector extraction module, configured to perform wavelet packet-feature entropy vector extraction on the vibration signal to be measured when it is determined that the vibration signals to be measured are abnormal according to the standard vibration signals in the normal state; and a fault identification module, configured to input the extracted wavelet packet-feature entropy vectors into the pre-trained BP neural network for GIS mechanical fault identification, and output the corresponding fault.

The embodiments of the present disclosure have the following beneficial effects when implemented.

The present disclosure collects the vibration signals to be measured from various excitation sources of GIS in mechanical operation; when it is determined that the vibration signals to be measured are abnormal according to the standard vibration signals in the normal state, the wavelet packet-feature entropy vector extraction is performed on the vibration signals to be measured; the extracted wavelet packet-feature entropy vectors are input into the pre-trained BP neural network for GIS mechanical fault identification, and the corresponding fault is output. The disclosure integrates the vibration signals under the action of various excitation sources, extracts the feature entropy vectors according to the entropy theory, and constructs and trains a BP neural network that can classify and recognize various GIS mechanical faults, so as to perform comprehensive and effective GIS mechanical faults diagnose.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

It should be understood that the step numbers used in the text are only for convenience of description, and not as a limitation on the order of execution of the steps.

It should be understood that the terms used in the specification of the present disclosure are only for the purpose of describing specific embodiments and are not intended to limit the present disclosure. As used in the specification of the present disclosure and the appended claims, unless the context clearly indicates otherwise, the singular forms "a/an", "one" and "the" are intended to include plural forms.

The terms "comprising" and "including" indicate the existence of the described features, wholes, steps, operations, elements, and/or components, but do not exclude one or more other features, wholes, steps, operations, elements, components, and/or the existence or addition of its collection.

The term "and/or" refers to any combination of one or more of the associated listed items and all possible combinations, and includes these combinations.

GIS (Gas Insulated Switchgear, or gas insulated fully enclosed combined electrical appliance) includes a circuit breaker, an isolating switch, a grounding switch, a transformer, a lightning arrester, a bus bar, a connector and an outlet terminal, etc. These devices or components are all enclosed in a metal grounded shell. $SF_6$ insulating gas with a certain pressure is filled in the inside, so it is also called $SF_6$ fully enclosed combined electrical appliance.

Research has found that there are two main causes of GIS faults. First, in the process of manufacturing GIS, irregular operations such as air or oil leakage will cause GIS faults. On the other hand, mechanical faults are also the main causes of GIS faults. The mechanical faults are those caused by aging of the components and the poor contact therebetween in the sealed high-pressure environment. In this case, the mechanical faults will cause the problems such as gas leakage and insulation fault. Since there are switching devices such as circuit breakers and isolating switches inside the GIS, the reliability of the operating mechanism is very important to the reliability of the GIS equipment.

Figure 1:
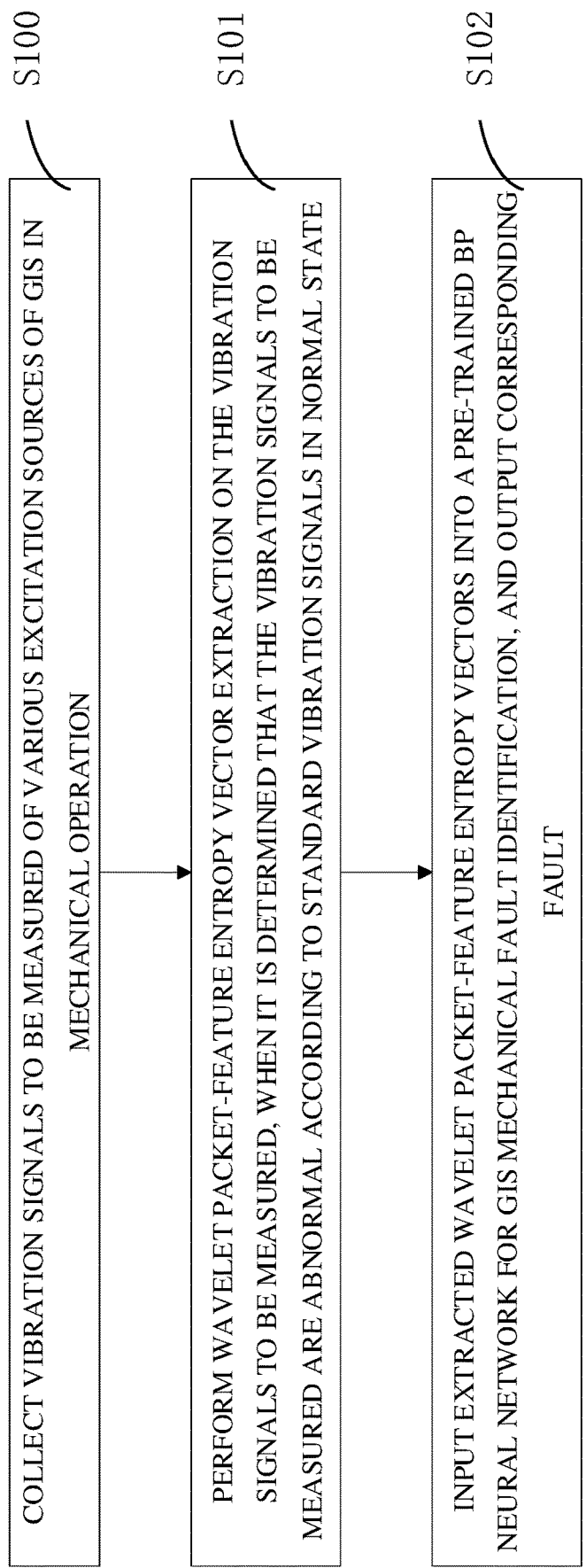
FIG. 1 is a flow diagram of a GIS mechanical fault diagnosis method provided by an embodiment of the present disclosure.

Please refer to FIG. 1, an embodiment of the present disclosure provides a GIS mechanical fault diagnosis method, including:

S100, collecting vibration signals to be measured of various excitation sources of the GIS in mechanical operation.

The vibration signals to be measured include vibration signal excited by an operating mechanism and vibration signal excited by electromagnetic force, and the operating mechanism includes a circuit breaker, an isolating switch, and a grounding switch.

In a preferred embodiment, the collection time of the vibration signal excited by the electromagnetic force is 2 seconds, and the sampling frequency is 20 KHz; and
the collection period of the vibration signal excited by the operating mechanism is from the start time to the end time of the operation of the operating mechanism and 0.5 second extended.

S101, performing wavelet packet-feature entropy vector extraction on the vibration signals to be measured, when it is determined that the vibration signals to be measured are abnormal according to standard vibration signals in the normal state.

Determining that the vibration signals to be measured are abnormal according to the standard vibration signals in the normal state includes:
extracting the envelope of the vibration signal excited by the operating mechanism to obtain the envelope area by using Hilbert method; at the same time, extracting the vibration energy of the vibration signal excited by the electromagnetic force at the set frequency by using the FFT method.

It is understandable that the sudden change information of the vibration signals is often reflected in the envelope of the signal. The high-frequency component contained in the vibration shock of the operating mechanism is the carrier of the envelope signal, and the Hilbert method is often used to extract the envelope of the vibration signal in the GIS mechanical fault diagnosis.

It is determined that the vibration signals to be measured are abnormal when the envelope area corresponding to the vibration signal excited by at least one operating mechanism satisfies the set first formula, and/or the vibration energy satisfies the set second formula; in which,
the first formula is:

$$|E_S-E_{S0}|/E_{S0} \geq 5\%;$$

$E_S$ is the envelope area corresponding to the vibration signal excited by a certain operating mechanism, and $E_{S0}$ is the envelope area corresponding to the standard vibration signal excited by the operating mechanism; the second formula is:

$$|E_Q-E_{Q0}|/E_{Q0} \geq 5\%;$$

$E_Q$ is the vibration energy of the vibration signal excited by electromagnetic force at the set frequency, and $E_{Q0}$ is the vibration energy of the standard vibration signal excited by electromagnetic force at the set frequency.

In a preferred embodiment, the set frequency is 100 Hz.

In a specific embodiment, when the envelope area corresponding to the vibration signal excited by at least one operating mechanism satisfies the set first formula, and/or the vibration energy satisfies the set second formula, it is determined that the vibration signal to be measured is abnormal. It can be understood that the following situations are included:
when the envelope area corresponding to the vibration signals excited by any operating mechanism satisfies the set first formula, it is determined that the vibration signals to be measured are abnormal; or
when the envelope areas corresponding to the vibration signals excited by any two operating mechanisms satisfy the set first formula, it is determined that the vibration signals to be measured are abnormal; or
when the envelope areas corresponding to the vibration signals excited by three operating mechanisms all satisfy the set first formula, it is determined that the vibration signals to be measured are abnormal; or
when the envelope area corresponding to the vibration signal excited by any operating mechanism satisfies the set first formula, and the vibration energy satisfies the set second formula, it is determined that the vibration signal to be measured is abnormal; or
when the envelope areas corresponding to the vibration signals excited by any two operating mechanisms satisfy the set first formula, and the vibration energy satisfies the set second formula, it is determined that the vibration signals to be measured are abnormal; or
when the envelope areas corresponding to the vibration signals excited by three operating mechanisms all satisfy the set first formula, and the vibration energy satisfies the set second formula, it is determined that the vibration signals to be measured are abnormal.

In a preferred embodiment, it should be understood as follows.

When the envelope area corresponding to the vibration signal excited by the at least one operating mechanism satisfies the set first formula, and/or the vibration energy satisfies the set second formula, it is determined that the vibration signal to be measured is abnormal, which means:
when the envelope areas corresponding to the vibration signals excited by at least two operating mechanisms satisfy the set first formula, and the vibration energy satisfies the set second formula, it is determined that the vibration signals to be measured are abnormal.

It should be noted that the vibration signal excited by the operating mechanism is a non-stationary vibration signal, and the vibration signal excited by the electromagnetic force is a stationary vibration signal. The non-stationary vibration signal is verified by the envelope area of the standard vibration signal, the stationary vibration signal is verified by the vibration energy of the standard vibration signal, and both are verified at the same time for determining whether the vibration signals to be measured are abnormal or not. This can effectively and comprehensively determine that 1) the occurrence of partial discharge internally in the GIS; 2) vibration of the operating mechanism such as circuit breaker or isolating switch when in operating; 3) abnormal vibration of stationary mechanisms such as loose and deformed GIS cylinder fasteners; 4) abnormal vibration of some parts under the excitation of electrodynamic force; and 5) when the vibration frequencies of adjacent GIS equipment are the same, resonance will occur, causing abnormal vibration of the GIS.

In this embodiment, performing wavelet packet-feature entropy vector extraction on the vibration signals to be measured includes:
performing k-layer wavelet packet decomposition on the vibration signals to be measured, and reconstructing the vibration signals at the $2^k$-th node of the k-th layer; and
extracting the envelope of each reconstructed vibration signal, and dividing each envelope into N segments according to the principle of equal integral energy; and extracting the wavelet packet-feature entropy by the normalized value process, thereby obtaining the wavelet packet-feature entropy vectors.

It is understandable that the number of layers k of wavelet packet decomposition determines the frequency resolution, and its selection is determined by the main frequency of the original vibration signals and the characteristic frequency of each fault. If k is too small, it will be slow to react to small fluctuations in the frequency components and distribution; and if k is too large, it will not only increase the amount of calculation, but also may take normal fluctuations as faults, which is too sensitive.

The number of segments N determines the time resolution, which is mainly determined by the normal time fluctuation range of the impact events. If N is too small, it is difficult to detect small time fluctuations. If N is too large, the time resolution is too high, and normal event time deviation will be considered as a fault. When N is too large, when single points form segments, it is difficult to detect event time deviation or changes of frequency band component distribution.

Therefore, in a preferred embodiment, k=3; N=15; that is, the vibration signals to be measured are subjected to 3-layer wavelet packet decomposition, and the vibration signals are reconstructed at the 8 nodes of the third layer.

S102, inputting the extracted wavelet packet-feature entropy vector into the pre-trained BP neural network for GIS mechanical fault identification, and outputting the corresponding fault.

The training method of the BP neural network includes:
setting 8 neurons in the input layer and 3 neurons in the output layer, with the transfer function all being tan-sigmoid, the training function being traingd, and the expected error being 0.01.

The standard vibration signals in the normal state and the wavelet packet-feature entropy vectors of the vibration signals corresponding to various GIS mechanical faults are used as input to perform the training of the BP neural network.

The standard vibration signals in the normal state and the vibration signals corresponding to various GIS mechanical faults are stored respectively in the vibration signal library of the normal state/standard vibration signal library and the vibration signal library corresponding to various GIS mechanical faults/library of vibration signals to be measured.

According to the training results, it is determined that the number of hidden layer neurons is 10, and the step size is 0.31.

Research on the GIS mechanical fault diagnosis to the vibration signal under the action of a single excitation source (single operating mechanism) can well classify and identify various fault states of a certain operating mechanism and give a relatively reliable diagnosis result. However, for the diagnosis of multiple vibration signals with multiple faults, the diagnosis method to the vibration signal under the action of a single excitation source is often ineffective. This embodiment integrates the vibration signals under the action of various excitation sources, extracts the feature entropy vector according to the entropy theory, and constructs and trains a BP neural network that can classify and recognize various GIS mechanical faults, so as to perform comprehensive and effective GIS mechanical faults diagnose.

Figure 2:
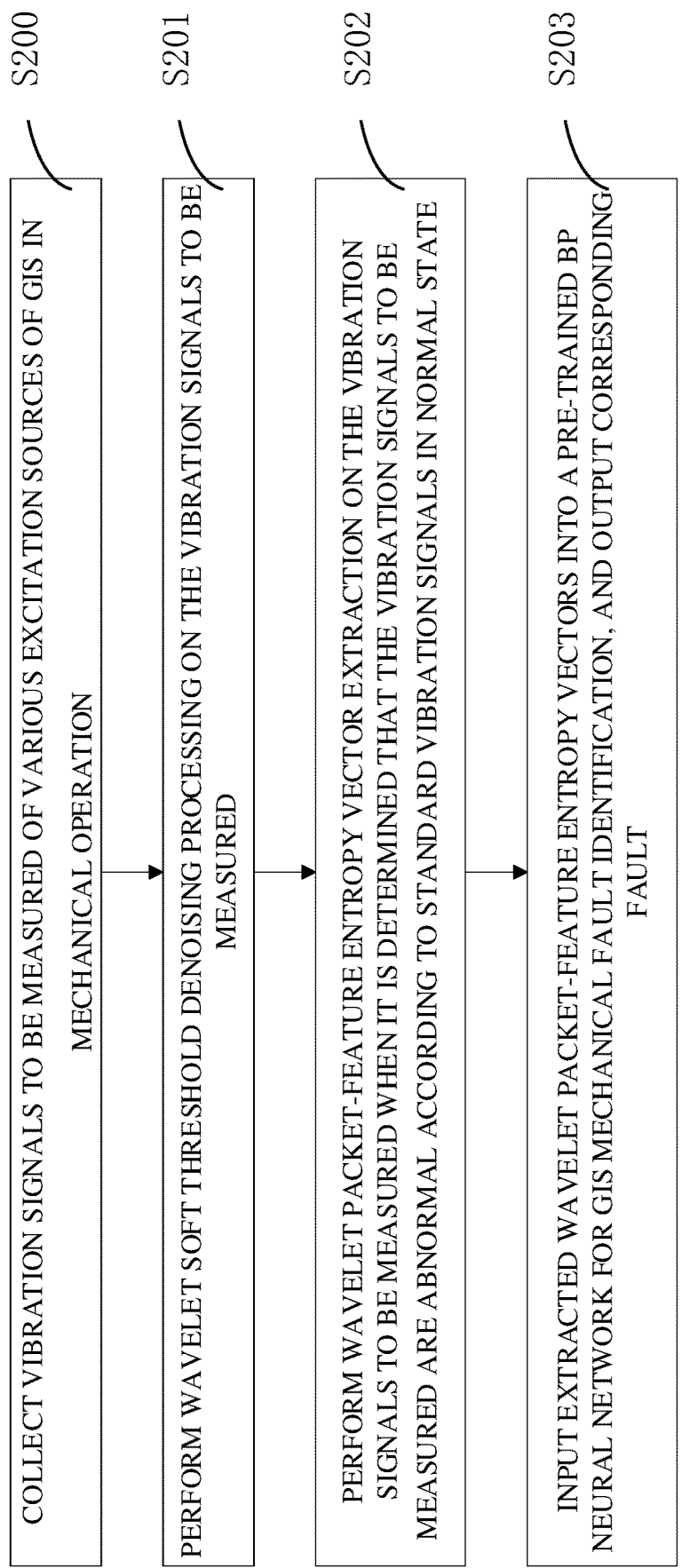
FIG. 2 is another flow diagram of a GIS mechanical fault diagnosis method provided by an embodiment of the present disclosure.
Figure 3:
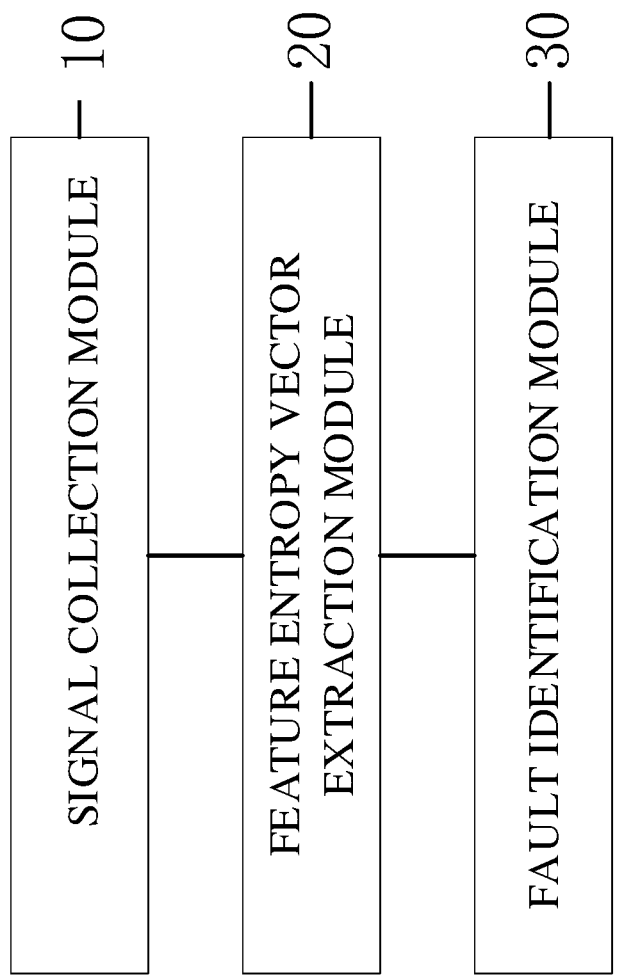
FIG. 3 is a schematic structural diagram of a GIS mechanical fault diagnosis device provided by an embodiment of the present disclosure.

Please refer to FIG. 2. In a preferred embodiment, a GIS mechanical fault diagnosis method is provided, including:

S200, collecting the vibration signals to be measured of various excitation sources of the GIS in mechanical operation, and S201, performing wavelet soft threshold denoising processing on the vibration signals to be measured.

In a preferred embodiment, the wavelet soft threshold is 2.1.

S202, when it is determined that the vibration signals to be measured are abnormal according to the standard vibration signals in the normal state, performing wavelet packet-feature entropy vector extraction on the vibration signals to be measured.

In a preferred embodiment, for the vibration signals to be measured after the denoising processing, db10 of the Daubechies wavelet series is used as the wavelet base function for wavelet packet decomposition.

It is understandable that first, wavelet soft threshold denoising is performed on the collected vibration signals to be measured using wavelet transform. After many experiments, the threshold value is 2.1 according to the denoising effect, and the reconstructed vibration signals after denoising are obtained (experimental verification shows that the denoising effect is very obvious); the denoised vibration signals of each group are decomposed by wavelet packet, and Daubechies10 wavelet is used as the wavelet basis function; by considering the calculation amount and the diagnosis effect comprehensively, the number of layers for decomposition is 3; then use the coefficients of each node of the third layer to reconstruct the signal, and use the Hilbert transform to obtain the envelope of the reconstructed signal from the 8 nodes of the third layer.

S203, inputting the extracted wavelet packet-feature entropy vector into the pre-trained BP neural network for GIS mechanical fault identification, and outputting the corresponding fault.

In a specific embodiment, the MATLAB neural network tool is used to construct a single hidden layer BP neural network, with 8 neurons in the input layer and 3 neurons in the output layer. The transfer functions are all tan-sigmoid, and the number of hidden layer neurons and the step size are selected according to the training results. The training function is set as traingd, and the expected error is 0.01.

After many adjustments and training, the number of hidden layer neurons is finally selected to be 10, and the step size is 0.31.

Figure 4:
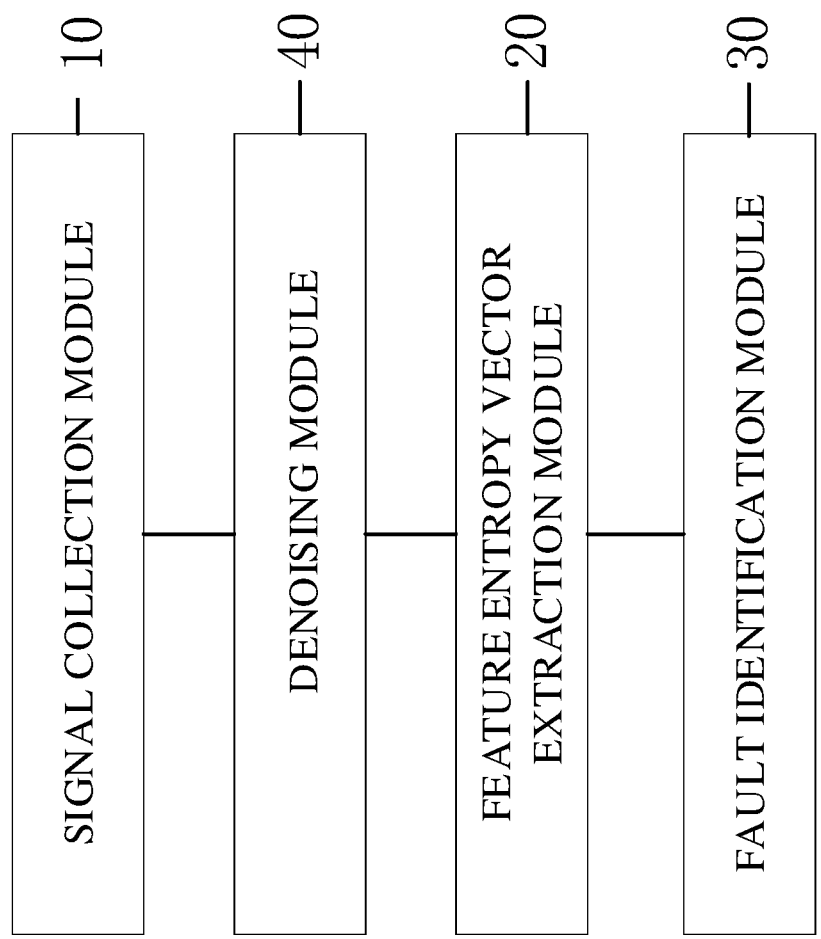
FIG. 4 is another structural diagram of a GIS mechanical fault diagnosis device provided by an embodiment of the present disclosure.

Referring to FIG. 4, an embodiment of the present disclosure also provides a GIS mechanical fault diagnosis device, including:

a signal collection module 10, configured to collect the vibration signals to be measured from various excitation sources of the GIS in the mechanical operation.

The vibration signals to be measured includes vibration signal excited by an operating mechanism and vibration signal excited by electromagnetic force, and the operating mechanism includes a circuit breaker, an isolating switch, and a grounding switch.

In a preferred embodiment, the collection time of the vibration signal excited by the electromagnetic force is 2 seconds, and the sampling frequency is 20 KHz; and
the collection period of the vibration signal excited by the operating mechanism is from the start time to the end time of the operation of the operating mechanism by 0.5 second extended.

A feature entropy vector extraction module 20 is configured to perform wavelet packet-feature entropy vector extraction on the vibration signals to be measured when it is determined that the vibration signals to be measured are abnormal according to the standard vibration signals in the normal state.

Determining that the vibration signals to be measured are abnormal according to the standard vibration signals in the normal state includes:
extracting the envelope of the vibration signal excited by the operating mechanism to obtain the envelope area by using Hilbert method; at the same time, extracting the vibration energy of the vibration signal excited by the electromagnetic force at the set frequency by using the FFT method.

It is understandable that the sudden change information of the vibration signal is often reflected in the envelope of the signal. The high-frequency component contained in the vibration shock of the operating mechanism is the carrier of the envelope signal, and the Hilbert method is often used to extract the envelope of the vibration signal in the GIS mechanical fault diagnosis.

When the envelope area corresponding to the vibration signal excited by at least one operating mechanism satisfies the set first formula, and/or the vibration energy satisfies the set second formula, it is determined that the vibration signals to be measured are abnormal; in which, the first formula is:

$$|E_S - E_{S0}|/E_{S0} \geq 5\%;$$

$E_S$ is the envelope area corresponding to the vibration signal excited by a certain operating mechanism, and $E_{S0}$ is the envelope area corresponding to the standard vibration signal excited by the operating mechanism.

The second formula is:

$$|E_Q - E_{Q0}|/E_{Q0} \geq 5\%;$$

$E_Q$ is the vibration energy of the vibration signal excited by electromagnetic force at the set frequency, and $E_{Q0}$ is the vibration energy of the standard vibration signal excited by electromagnetic force at the set frequency.

In a preferred embodiment, the set frequency is 100 Hz.

In a preferred embodiment, it should be understood as follows.

When the envelope area corresponding to the vibration signal excited by the at least one operating mechanism satisfies the set first formula, and/or the vibration energy satisfies the set second formula, it is determined that the vibration signals to be measured are abnormal, including:

when the envelope areas corresponding to the vibration signals excited by at least two operating mechanisms satisfy the set first formula, and the vibration energy satisfies the set second formula, it is determined that the vibration signals to be measured are abnormal.

It should be noted that the vibration signal excited by the operating mechanism is a non-stationary vibration signal, and the vibration signal excited by the electromagnetic force is a stationary vibration signal. The non-stationary vibration signal is verified by the envelope area of the standard vibration signal, the stationary vibration signal is verified by the vibration energy of the standard vibration signal, and both are verified at the same time for determining whether the vibration signals to be measured are abnormal or not. This can effectively and comprehensively determine that 1) the occurrence of partial discharge internally in the GIS; 2) vibration of the operating mechanism such as circuit breaker or isolating switch when in operating; 3) abnormal vibration of stationary mechanisms such as loose and deformed GIS cylinder fasteners; 4) abnormal vibration of some parts under the excitation of electrodynamic force; and 5) when the vibration frequencies of adjacent GIS equipment are the same, resonance will occur, causing abnormal vibration of the GIS.

In this embodiment, the wavelet packet-feature entropy vector extraction on the vibration signals to be measured includes:

performing k-layer wavelet packet decomposition on the vibration signals to be measured, and reconstructing the vibration signals at the $2^k$-th node of the k-th layer; and extracting the envelope of each reconstructed vibration signal, and dividing each envelope into N segments according to the principle of equal integral energy; and extracting the wavelet packet-feature entropy by the normalized value process, thereby obtaining the wavelet packet-feature entropy vectors.

It is understandable that the number of layers k of wavelet packet decomposition determines the frequency resolution, and its selection is determined by the main frequency of the original vibration signal and the characteristic frequency of each fault. If k is too small, it will be slow to react to small fluctuations in the frequency components and distribution; and if k is too large, it will not only increase the amount of calculation, but also may take normal fluctuations as faults, which is too sensitive.

The number of segments N determines the time resolution, which is mainly determined by the normal time fluctuation range of the impact events. If N is too small, it is difficult to detect small time fluctuations. If N is too large, the time resolution is too high, and normal event time deviation will be considered as a fault. When N is too large, when single points form segments, it is difficult to detect event time deviation or changes of frequency band component distribution.

Therefore, in a preferred embodiment, k=3; N=15; that is, the vibration signals to be measured are subjected to 3-layer wavelet packet decomposition, and the vibration signals are reconstructed at the 8 nodes of the third layer.

A fault identification module 30 is configured to input the extracted wavelet packet-feature entropy vector into the pre-trained BP neural network for GIS mechanical fault identification, and output the corresponding fault.

The training method of the BP neural network includes:

setting 8 neurons in the input layer and 3 neurons in the output layer, with the transfer function all being tansigmoid, the training function being traingd, and the expected error being 0.01;

using the standard vibration signals in the normal state and the wavelet packet-feature entropy vectors of the vibration signals corresponding to various GIS mechanical faults as input to perform the training of the BP neural network; and determining that the number of hidden layer neurons is 10 and the step size is 0.31 according to the training results.

Research on the GIS mechanical fault diagnosis to the vibration signal under the action of a single excitation source (single operating mechanism) can well classify and identify various fault states of a certain operating mechanism and give a relatively reliable diagnosis result. However, for the diagnosis of multiple vibration signals with multiple faults, the diagnosis method to the vibration signal under the action of a single excitation source is often ineffective. This embodiment integrates the vibration signals under the action of various excitation sources, extracts the feature entropy vector according to the entropy theory, and constructs and trains a BP neural network that can classify and recognize various GIS mechanical faults, so as to perform comprehensive and effective GIS mechanical faults diagnose.

Please refer to FIG. 4. In a preferred embodiment, a GIS mechanical fault diagnosis device is provided, including:

a denoising module 40, configured to perform wavelet soft threshold denoising processing on the vibration signals to be measured.

In a preferred embodiment, the wavelet soft threshold is 2.1.

For the feature entropy vector extraction module 20, in a preferred embodiment, for the vibration signals to be measured after the denoising processing, db10 of the Daubechies wavelet series is used as the wavelet base function for wavelet packet decomposition.

It is understandable that first, wavelet soft threshold denoising is performed on the collected vibration signals to be measured using wavelet transform. After many experiments, the threshold value is 2.1 according to the denoising effect, and the reconstructed vibration signals after denoising are obtained (experimental verification shows that the denoising effect is very obvious); the denoised vibration signals of each group are decomposed by wavelet packet, and Daubechies 10 wavelet is used as the wavelet basis function; by considering the calculation amount and the diagnosis effect comprehensively, the number of layers for decomposition is 3; then use the coefficients of each node of the third layer to reconstruct the signal, and use the Hilbert transform to obtain the envelope of the reconstructed signal from the 8 nodes of the third layer.

A person of ordinary skill in the art can understand that all or part of the processes in the above-mentioned embodiment methods can be implemented by instructing relevant hardware through a computer program. The program can be stored in a computer monitorable storage medium, which, when executed, may perform processes including that of the above-mentioned method embodiments. The storage medium may be a magnetic disk, an optical disc, a read-only memory (Read-Only Memory, ROM), or a random-access memory (Random Access Memory, RAM), etc.

The above are the preferred embodiments of the present disclosure. It should be pointed out that for those of ordinary skill in the art, without departing from the principle of the present disclosure, several improvements and modifications can be made, and these improvements and modifications are also considered as within the protection scope of the present disclosure.

The inventionn claimed is:

1. A gas insulated switchgear (GIS) mechanical fault diagnosis method, comprising:
    collecting vibration signals to be measured of various excitation sources of GIS in mechanical operation;
    performing wavelet packet-feature entropy vector extraction on the vibration signals to be measured, in response to determining that the vibration signals to be measured are abnormal according to standard vibration signals in normal state; and
    inputting extracted wavelet packet-feature entropy vectors into a pre-trained back propagation (BP) neural network for GIS mechanical fault identification, and outputting corresponding fault;
    wherein the vibration signals to be measured comprise vibration signal excited by an operating mechanism and vibration signal excited by electromagnetic force, and the operating mechanism comprises a circuit breaker, an isolating switch, and a grounding switch;
    wherein determining that the vibration signals to be measured are abnormal according to standard vibration signals in normal state comprises:
    extracting an envelope of the vibration signal excited by the operating mechanism to obtain envelope area by using Hilbert method; at the same time, extracting vibration energy of the vibration signal excited by the electromagnetic force at set frequency by using fast fourier transform (FFT) method;
    determining that the vibration signals to be measured are abnormal in response to that the envelope area corresponding to the vibration signal excited by at least one operating mechanism satisfies a set first formula, and/or the vibration energy satisfies a set second formula; in which,
    the first formula is:

$|E_S - E_{S0}|/E_{S0} \times 100\% \geq 5\%$ $E_S$ is the envelope area corresponding to the vibration signal excited by a certain operating mechanism, and $E_{S0}$ the envelope area corresponding to the standard vibration signal excited by the operating mechanism; and
    the second formula is:

$|E_Q - E_{Q0}|/E_{Q0} \times 100\% \geq 5\%$ $E_Q$ is the vibration energy of the vibration signal excited by electromagnetic force at the set frequency, and $E_{Q0}$ is the vibration energy of the standard vibration signal excited by electromagnetic force at the set frequency;
    wherein the set frequency is 100 Hz;
    a collection time of the vibration signal excited by the electromagnetic force is 2 seconds, and a sampling frequency is 20 KHz; and
    a collection period of the vibration signal excited by the operating mechanism is from a start time to an end time of an operation of the operating mechanism and 0.5 second extended.

2. The GIS mechanical fault diagnosis method of claim 1, wherein determining that the vibration signals to be measured are abnormal in response to that the envelope area corresponding to the vibration signal excited by at least one operating mechanism satisfies the set first formula, and/or the vibration energy satisfies the set second formula comprises:
    determining that the vibration signals to be measured are abnormal in response to that the envelope areas corresponding to the vibration signals excited by at least two operating mechanisms satisfy the set first formula, and the vibration energy of the vibration signal excited by the electromagnetic force satisfies the set second formula.

3. The GIS mechanical fault diagnosis method of claim 1, wherein after collecting vibration signals to be measured of various excitation sources of GIS in mechanical operation, the method further comprises:
    performing wavelet soft threshold denoising processing on the vibration signals to be measured; and
    for the vibration signals to be measured after denoising processing, performing wavelet packet decomposition by using db10 of Daubechies wavelet series as wavelet base function.

4. The GIS mechanical fault diagnosis method of claim 3, wherein performing wavelet packet-feature entropy vector extraction on the vibration signals to be measured comprises:
    performing k-layer wavelet packet decomposition on the vibration signals to be measured, and reconstructing the vibration signals at $2^k$-th node of k-th layer; and
    extracting an envelope of each reconstructed vibration signal, and dividing each envelope into N segments according to principle of equal integral energy; and extracting the wavelet packet-feature entropy by normalized value process, thereby obtaining the wavelet packet-feature entropy vectors.

5. The GIS mechanical fault diagnosis method of claim 4, wherein the wavelet soft threshold is 2.1, and k=3; N=15.

6. The GIS mechanical fault diagnosis method of claim 1, wherein training method of the BP neural network comprises:
    setting 8 neurons in an input layer and 3 neurons in an output layer, with transfer functions all being tansigmoid, training function being traingd, and expected error being 0.01;

using the standard vibration signals in the normal state and the wavelet packet-feature entropy vectors of the vibration signals corresponding to various GIS mechanical faults as input to perform training of the BP neural network; and determining that a number of hidden layer neurons is 10 and a step size is 0.31 according to training results.

* * * * *